W. CHAPPELL.
NUT HULLER.
APPLICATION FILED MAR. 4, 1912.

1,037,128.

Patented Aug. 27, 1912.

Witnesses

Inventor
William Chappell

UNITED STATES PATENT OFFICE.

WILLIAM CHAPPELL, OF SAN JOSE, CALIFORNIA.

NUT-HULLER.

1,037,128.  Specification of Letters Patent.  Patented Aug. 27, 1912.

Application filed March 4, 1912. Serial No. 681,575.

*To all whom it may concern:*

Be it known that I, WILLIAM CHAPPELL, a citizen of the United States, residing at San Jose, in the county of Santa Clara and State of California, have invented new and useful Improvements in Nut-Hullers, of which the following is a specification.

My invention relates to a device for the removal of the outside husk from nuts, such as almonds, which have a husk of this character, means for automatically adjusting the apparatus for varying sizes of nuts which may be passed through it indiscriminately, and means for separating the nuts and the removed husks.

It consists in the combination of parts and details of construction which will be more fully explained by reference to the accompanying drawings in which—

Figure 1:
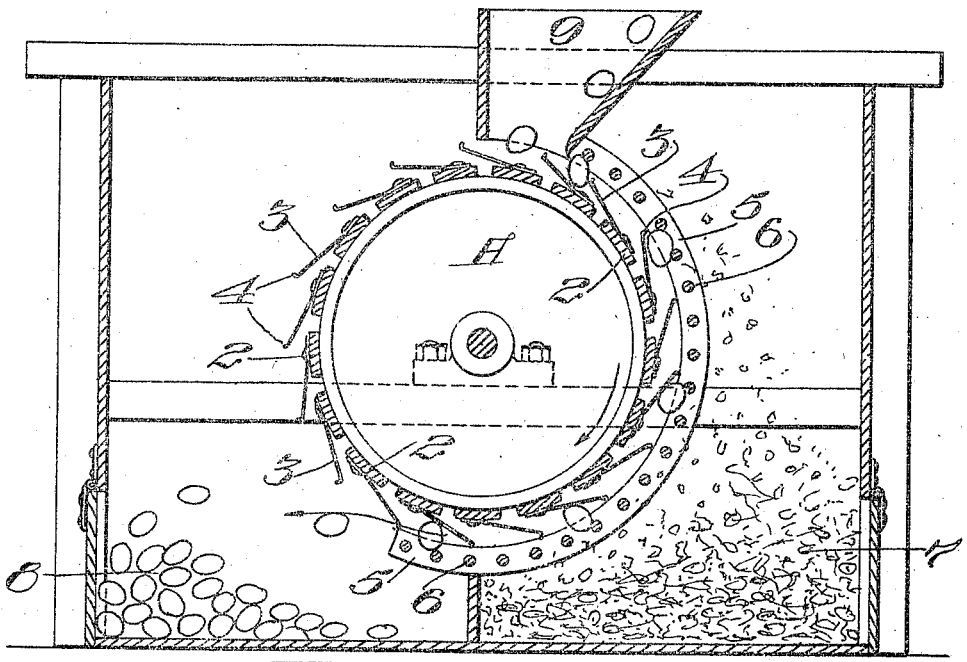
Figure 2:
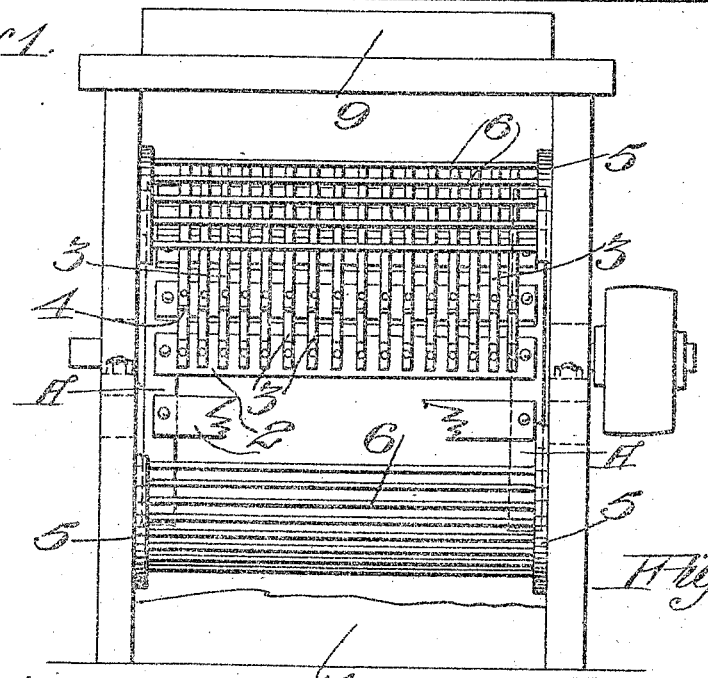

Figure 1 is a side elevation of my apparatus. Fig. 2 is a front view showing the cylinder and engaging arms partly broken away.

As shown in the drawings, A is a revoluble cylinder, of any suitable length between the ends, and having bars 2 extending from one end to the other of its periphery. To these bars are fixed a series of independent, elastic arms 3, the outer ends of which are turned outward, as shown at 4.

5 is a segmental case formed of rods 6 and extending from end to end concentric with the cylinder and at such a distance that nuts which may be introduced into the upper part of the apparatus through a hopper 9 will be received between the arms 3 and the exterior rods 6. These rods are placed at such a distance apart that the smallest nuts will not pass between them but the broken husks will be delivered between these bars as the cylinder revolves and carries them toward the lower part of the inclosing device so that the broken husks will fall into a receptacle, as at 7.

The nuts of various sizes are allowed to pass between the cylinder and the exterior bars by reason of the elasticity of the arms 3 which will yield for larger nuts and will spring outward when smaller ones are passing. The outwardly turned hook-like ends 4 of the bars 3 play an important part as they seize the nuts and drag them forcibly across the bars; the friction produced in this action serving to tear away such husks as naturally adhere more forcibly to the outer shell of the nut. When the nuts reach the end of the segment 5 they will naturally fall into a receptacle, as at 8, or may be otherwise properly disposed of.

Having thus described my invention, what I claim and desire to secure by Letters Patent is—

An improved nut hulling apparatus having in combination a cylinder or drum having peripheral, separated bars extending from end to end, a concentric inclosing segment having interspaced rods also extending from end to end between which the nuts may be delivered, a series of elastic arms fixed to each bar of the cylinder and extending backwardly from the direction of rotation and self-adjusting to the different sizes of nuts, said elastic arms having hooked outer ends adapted to forcibly drag the nuts and engage them with the inclosing rods.

In testimony whereof I have hereunto set my hand in the presence of two subscribing witnesses.

WILLIAM CHAPPELL.

Witnesses:
J. C. CONKLING,
MARGARET LEAL.